(12) United States Patent
Yang

(10) Patent No.: US 7,321,408 B2
(45) Date of Patent: Jan. 22, 2008

(54) IN-PLANE FIELD TYPE TRANSFLECTIVE LIQUID CRYSTAL DISPLAY DEVICE

(75) Inventor: Chiu-Lien Yang, Miao-Li (TW)

(73) Assignee: Innolux Display Corp., Chu-Nan, Miao-Li County (TW)

( * ) Notice: Subject to any disclaimer, the term of this patent is extended or adjusted under 35 U.S.C. 154(b) by 342 days.

(21) Appl. No.: 11/028,031

(22) Filed: Dec. 31, 2004

(65) Prior Publication Data

US 2005/0190324 A1    Sep. 1, 2005

(30) Foreign Application Priority Data

Feb. 27, 2004   (TW) .............................. 93105064 A (51) Int. Cl.
*G02F 1/1335* (2006.01)
*G02F 1/1343* (2006.01)

(52) U.S. Cl. ...................... 349/114; 349/141

(58) Field of Classification Search ................. 349/114, 349/141
See application file for complete search history.

(56) References Cited

U.S. PATENT DOCUMENTS

| | | | |
|---|---|---|---|
| 5,220,444 A | 6/1993 | Mitsui et al. | |
| 5,598,285 A | 1/1997 | Kondo et al. | |
| 5,684,551 A | 11/1997 | Nakamura et al. | |
| 5,691,791 A | 11/1997 | Nakamura et al. | |
| 5,737,046 A | 4/1998 | Moriwaki et al. | |
| 5,847,789 A | 12/1998 | Nakamura et al. | |
| 6,097,458 A | 8/2000 | Tsuda et al. | |
| 6,195,140 B1 | 2/2001 | Kubo et al. | |
| 6,215,538 B1 | 4/2001 | Narutaki et al. | |
| 6,281,952 B1 | 8/2001 | Okamoto et al. | |
| 6,295,109 B1 | 9/2001 | Kubo et al. | |
| 6,330,047 B1 | 12/2001 | Kubo et al. | |
| 6,341,002 B1 | 1/2002 | Shimizu et al. | |
| 6,366,333 B1 | 4/2002 | Yamamoto et al. | |
| 6,433,847 B1 | 8/2002 | Minoura | |
| 6,452,654 B2 | 9/2002 | Kubo et al. | |
| 6,501,521 B2 | 12/2002 | Matsushita et al. | |
| 6,650,385 B1* | 11/2003 | Liu ........................... | 349/113 |
| 6,914,656 B2* | 7/2005 | Sakamoto et al. .......... | 349/141 |

* cited by examiner

*Primary Examiner*—David Nelms
*Assistant Examiner*—David Y. Chung
(74) *Attorney, Agent, or Firm*—Wei Te Chung (57) ABSTRACT

A liquid crystal display device (10) includes an upper substrate (12), a lower substrate (14) and a liquid crystal layer (16) interposed between the upper substrate and the lower substrate. A plurality of pixel regions, each pixel region comprising a pixel electrode and a common electrode (148a, 148b), for applying a voltage to the liquid crystal layer. Each pixel region includes a reflection region and a transmission region; and all the pixel and common electrodes are positioned at either the upper substrate or the lower substrate. The display working both in reflection mode and transmission mode has a wide view angle.

19 Claims, 9 Drawing Sheets

IN-PLANE FIELD TYPE TRANSFLECTIVE LIQUID CRYSTAL DISPLAY DEVICE

BACKGROUND OF THE INVENTION

CROSS REFERENCE TO RELATED APPLICATION

This application is related to a co-pending application entitled "transflective mode liquid crystal display," and assigned to the same assignee as this application.

1. Field of the Invention

The present invention relates to a liquid crystal display. More particularly, the present invention relates to an in-plane field type liquid crystal display device having a transmission display region and a reflection display region in each pixel.

2. Description of the Prior Art

Due to the features of being thin and consuming little power, liquid crystal display devices have been used in a broad range of fields. Applications include office automation (OA) apparatuses such as word processors and personal computers, portable information apparatuses such as portable electronic schedulers, videocassette recorders (VCRs) provided with information panels, and mobile phones provided with liquid crystal monitors.

Unlike with a cathode ray tube (CRT) display or an electroluminescence (EL) display, the liquid crystal display screen of a liquid crystal display device does not emit light itself. Instead, in a conventional transmission type liquid crystal display device, an illuminator called a backlight is provided at a rear or one side of the liquid crystal display device. The amount of light received from the backlight which passes through the liquid crystal panel is controlled by the liquid crystal panel, in order to obtain images for display.

In the transmission type liquid crystal display device, the backlight consumes 50% or more of the total power consumed by the liquid crystal display device. That is, the backlight is a major contributor to power consumption.

In order to overcome the above problem, a reflection type liquid crystal display device has been developed for portable information apparatuses which are often used outdoors or in places where artificial ambient light is available. The reflection type liquid crystal display device is provided with a reflector formed on one of a pair of substrates, instead of having a backlight. Ambient light is reflected from a surface of the reflector to illuminate the display screen.

The reflection type liquid crystal display device using the reflection of ambient light is disadvantageous, insofar as the visibility of the display screen is extremely low when the surrounding environment is dark. Conversely, the transmission type liquid crystal display device is disadvantageous when the surrounding environment is bright. That is, the color reproduction is low and the display screen is not sufficiently clear because the display brightness is only slightly less than the brightness of the ambient light. In order to improve the display quality in a bright surrounding environment, the intensity of the light from the backlight needs to be increased. This increases the power consumption of the backlight and reduces the efficiency of the liquid crystal display device. Moreover, when the liquid crystal display device needs to be viewed at a position exposed to direct sunlight or direct artificial light, the display quality is generally lower. For example, when a display screen fixed in a car or a display screen of a personal computer receives direct sunlight or artificial light, surrounding images are reflected from the display screen, making it difficult to observe the images of the display screen itself.

In order to overcome the above problems, an apparatus which realizes both a transmission mode display and a reflection mode display in a single liquid crystal display device has been developed. The apparatus is called as a transflective liquid crystal display, and has been disclosed in literature such as Japanese Laid-Open Publication No. 7-333598. The transflective liquid crystal display device uses a semi-transmissive reflection film which partly transmits light and partly reflects light. Typically, the transflective liquid crystal display includes an upper substrate, a lower substrate, a liquid crystal layer interposed between the substrates, and the semi-transmissive reflection film. A common electrode is positioned on the upper substrate, and a plurality of pixel electrodes are positioned on the lower substrate. However, the transflective liquid crystal display still has an inherent drawback that cannot be eliminated; namely, a very narrow viewing angle. By adding one or more compensation films on the transflective liquid crystal display, this problem can be ameliorated to some extent. However, the extra components increase costs proportionately.

It is desired to provide an in-plane field type transflective liquid crystal display which overcomes the above-described deficiencies.

SUMMARY OF THE INVENTION

Accordingly, an object of the present invention is to provide a liquid crystal display device which has a wide view angle and which can work in both a reflection mode and a transmission mode.

Another object of the present invention is to provide a liquid crystal display device providing a bright, clear display under any ambient light conditions.

To achieve the above objects, a liquid crystal display device in accordance with the present invention comprises an upper substrate, a lower substrate and a liquid crystal layer interposed between the upper substrate and the lower substrate. A plurality of pixel regions, each pixel region comprising a pixel electrode and a common electrode, for applying a voltage to the liquid crystal layer. Each pixel region includes a reflection region and a transmission region; and all the pixel and common electrodes are positioned at either the upper substrate or the lower substrate.

In certain embodiments, the liquid crystal layer has different thicknesses in the reflection region and the transmission region of each pixel region. In further embodiments, the liquid crystal display device includes a color filter layer with different thicknesses in the reflection region and the transmission region of each pixel region. Alternatively, a part of the color filter layer in the reflection region of each pixel region has no color dye therein.

Other objects, advantages and novel features of the present invention will be apparent from the following detailed description of exemplary embodiments thereof with reference to the attached drawings, in which:

DETAILED DESCRIPTION OF THE EXEMPLARY EMBODIMENTS

Figure 1A:
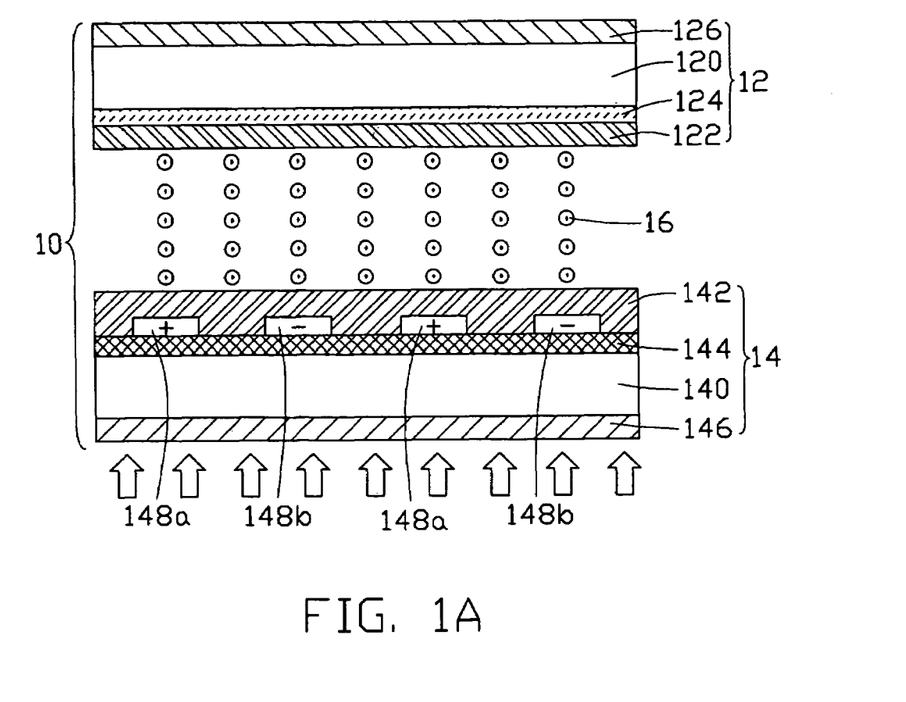
FIG. 1A is a schematic, cross-sectional view of one pixel region of an in-plane field type transflective liquid crystal display device ("the LCD") according to a first exemplary embodiment of the present invention, showing the LCD with no voltage applied, and backlight entering the LCD.
Figure 1B:
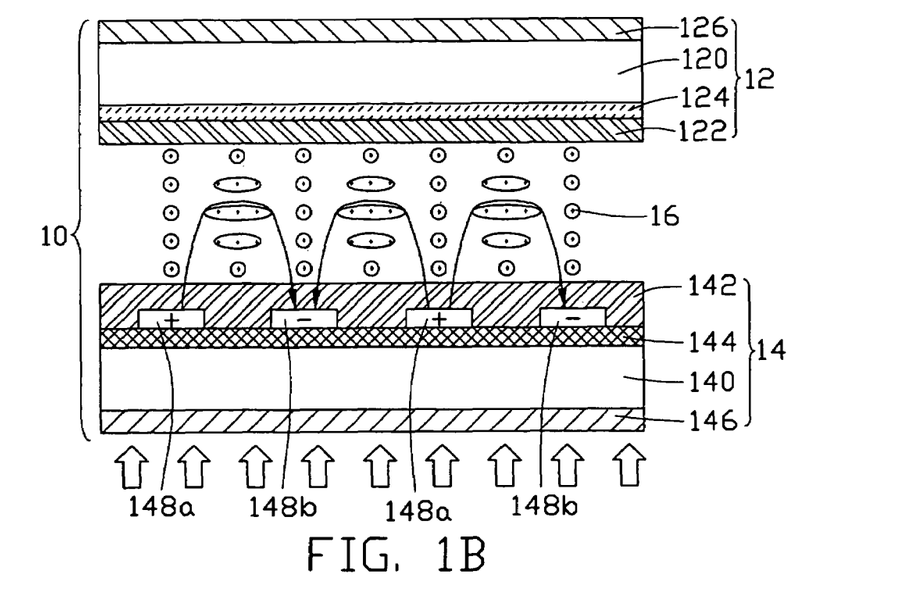
FIG. 1B is similar to FIG. 1A, but showing the LCD with a voltage applied and resulting electric fields.

Referring to FIGS. 1A and 1B, a liquid crystal display device 10 of Example 1 according to the present invention includes an upper substrate 12, a lower substrate 14, and a liquid crystal layer 16 interposed between the upper substrate 12 and the lower substrate 14. The upper substrate 12 comprises a color filter layer 124 and an upper polarizer 126 positioned respectively on opposite bottom and top surfaces of an upper glass plate 120. An upper alignment layer 122 is positioned on a bottom surface of the color filter layer 124 adjacent to the liquid crystal layer 16. The lower substrate 14 comprises a dielectric transflector 144 and a lower polarizer 146 positioned respectively on opposite top and bottom surfaces of a lower glass plate 140. A pair of electrodes is defined herein as a pixel electrode 148a and a common electrode 148b. A plurality of pairs of electrodes are positioned on the dielectric transflector 144 near the liquid crystal layer 16. A lower alignment layer 142 is positioned on the dielectric transflector 144 adjacent to the liquid crystal layer 16, the lower alignment layer 142 covering the pixel electrodes 148a and common electrodes 148b.

Figure 1C:
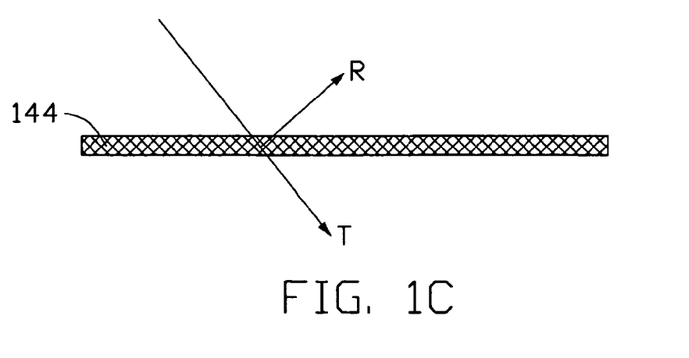
FIG. 1C is an enlarged view of a dielectric transflector of the LCD of FIGS. 1A and 1B, showing essential optical paths thereof.

The dielectric transflector 144 is a multi-layer stacked arrangement of dielectric materials. That is, each stack comprises a number of thin film dielectric layers. Referring to FIG. 11C, an optical reflectivity R and a transmissibility T of the dielectric transflector 144 can be controlled by configuring the thicknesses, the number and/or the refractive indexes of the layers thereof accordingly. That is, the duly configured dielectric transflector 144 can transmit backlight and can reflect ambient light. Thus the liquid crystal display device 10 provides a transflective display that works in both a transmission mode and a reflection mode. Further, because the dielectric transflector 144 does not conduct electricity, using the dielectric transflector 144 does not influence the distribution of electric fields in the liquid crystal layer 16.

In operation, when no voltage is applied between the pixel and common electrodes 148a and 148b, long axes of liquid crystal molecules in the liquid crystal layer 16 maintain a predetermined angle relative to the upper alignment layer 122 and the lower alignment layer 142, and the liquid crystal molecules are stationed parallel to the upper and lower substrates 12 and 14.

When a voltage is applied (in the driven state), an electric field (not labeled) is generated between the pixel and common electrodes 148a, 148b. Because the pixel electrodes 148a and the common electrodes 148b are on the same layer, the electric field is substantially parallel to the upper and lower substrates 12, 14. The substantially parallel electric field drives the liquid crystal molecules of the liquid crystal layer 16 to rotate so they have a new orientation that is still parallel to the upper and lower substrates 12 and 14. The change in orientation results in a change in light transmission, and the displayed image has the important advantage of a wide viewing angle.

Figure 2A:
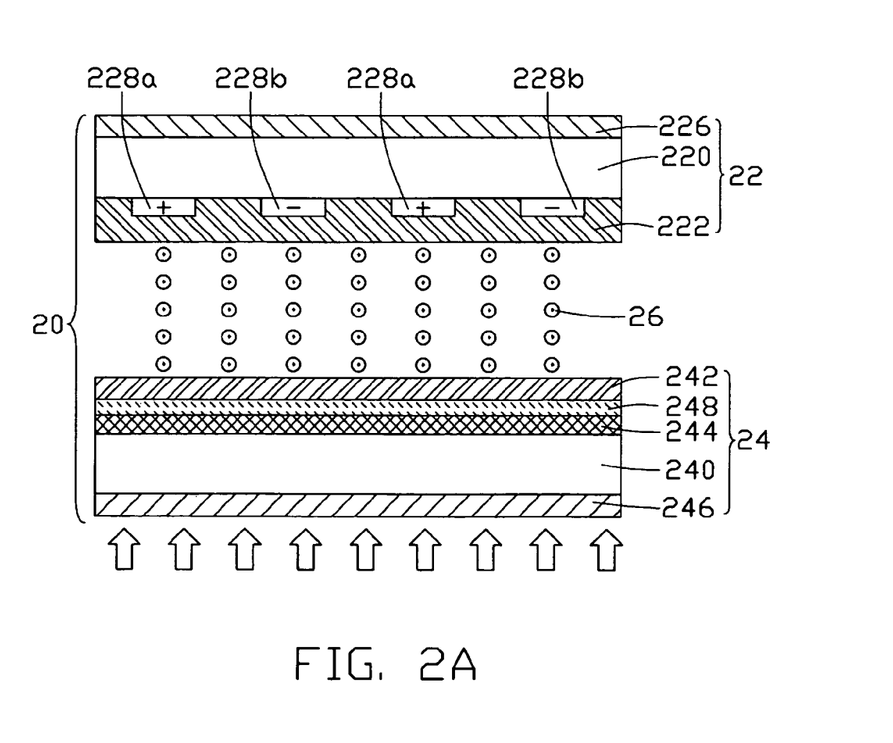
FIG. 2A is a schematic, cross-sectional view of one pixel region of an in-plane field type transflective liquid crystal display device ("the LCD") according to a second exemplary embodiment of the present invention, showing the LCD with no voltage applied, and backlight entering the LCD.
Figure 2B:
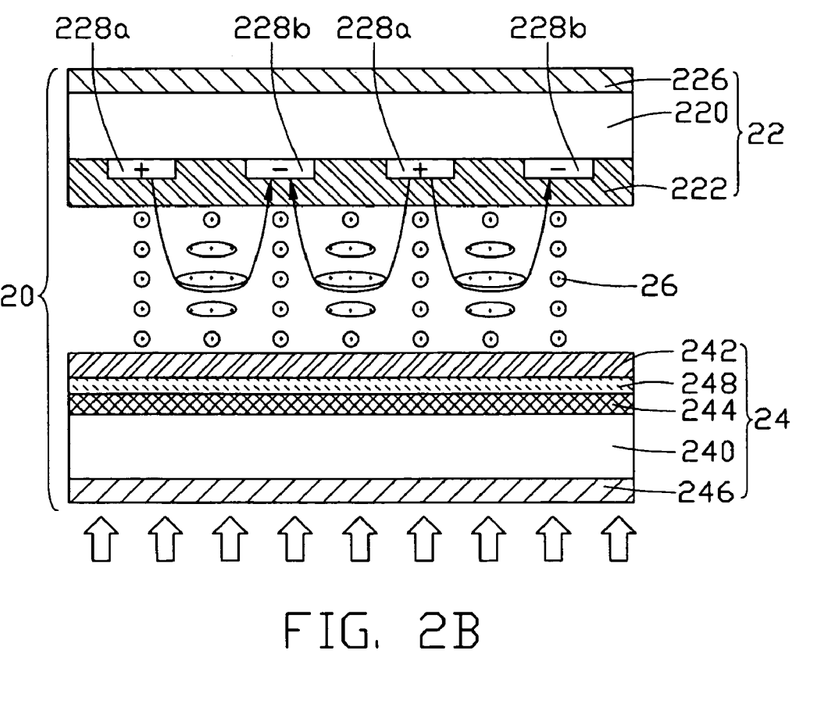
FIG. 2B is similar to FIG. 2A, but showing the LCD with a voltage applied and resulting electric fields.

Referring to FIGS. 2A and 2B, a liquid crystal display device 20 of Example 2 according to the present invention includes an upper substrate 22, a lower substrate 24, and a liquid crystal layer 26 interposed between the upper substrate 22 and the lower substrate 24. The upper substrate 22 comprises an upper alignment layer 222 and an upper polarizer 226 positioned respectively on opposite bottom and top surfaces of an upper glass plate 220. A pair of electrodes is defined herein as a pixel electrode 228a and a common electrode 228b. A plurality of pairs of electrodes are positioned on a bottom surface of the upper glass plate 220, the pairs of electrodes being covered by the upper alignment layer 222. The lower substrate 24 comprises a dielectric transflector 244 and a lower polarizer 246 positioned respectively on opposite top and bottom surfaces of a lower glass plate 240. A color filter layer 248 and a lower alignment layer 242 are stacked in that order from bottom to top on a top surface of the dielectric transflector 244, with the lower alignment layer 242 being adjacent to the liquid crystal layer 26. The dielectric transflector 244 has substantially the same structure as that of the dielectric transflector 144 of Example 1.

Figure 3:
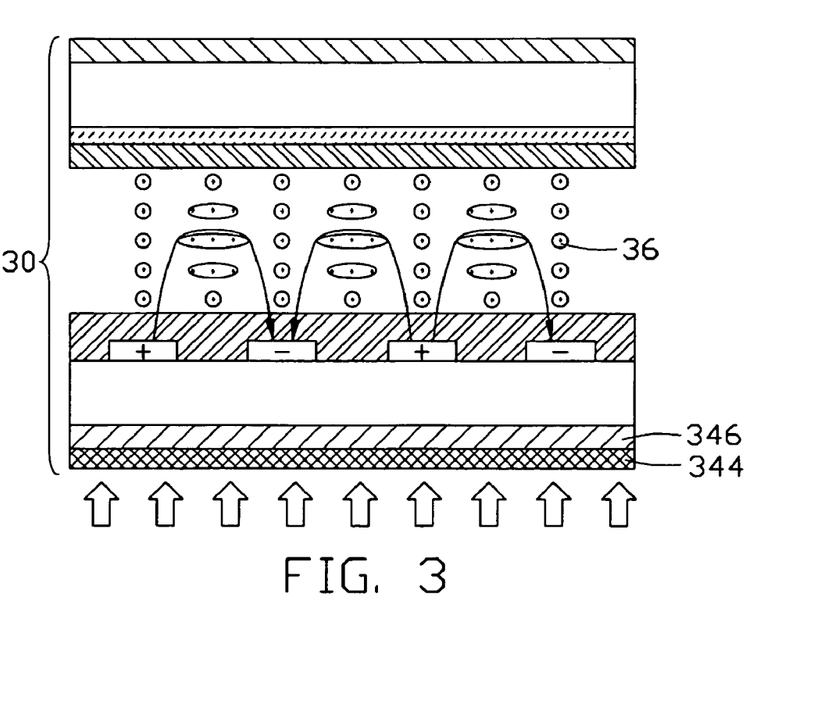
FIG. 3 is a schematic, cross-sectional view of one pixel region of an in-plane field type transflective liquid crystal display device ("the LCD") according to a third exemplary embodiment of the present invention, showing the LCD with a voltage applied and resulting electric fields, and backlight entering the LCD.

Referring to FIG. 3, a liquid crystal display device 30 of Example 3 according to the present invention is structured similar to the liquid crystal display device 10 of Example 1. The difference is that a dielectric transflector 344 of Example 3 is positioned far away from a liquid crystal layer 36, on a bottom surface of a lower polarizer 346.

Figure 4:
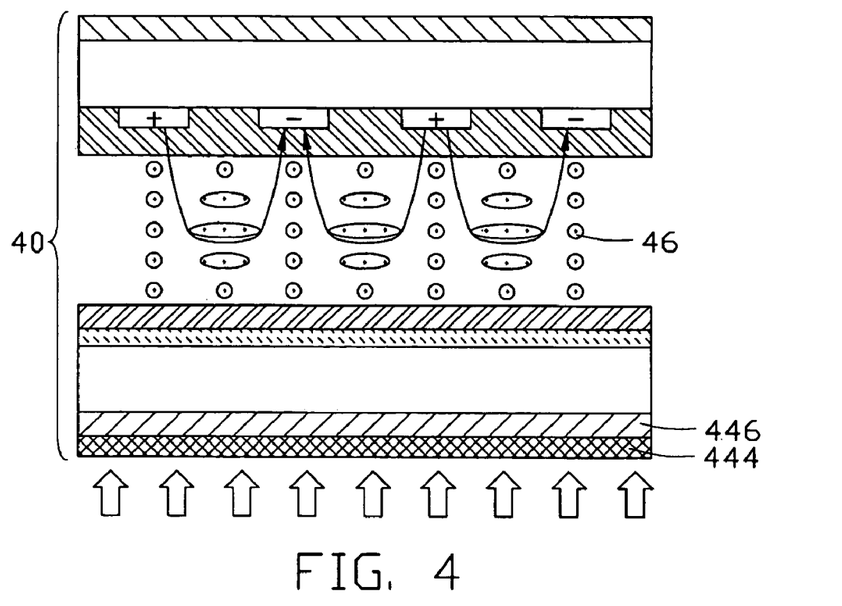
FIG. 4 is a schematic, cross-sectional view of one pixel region of an in-plane field type transflective liquid crystal display device ("the LCD") according to a fourth exemplary embodiment of the present invention, showing the LCD with a voltage applied and resulting electric fields, and backlight entering the LCD.

Referring to FIG. 4, a liquid crystal display device 40 of Example 4 according to the present invention is structured similar to the liquid crystal display device 20 of Example 2. The difference is that a dielectric transflector 444 of Example 4 is positioned far away from a liquid crystal layer 46, on a bottom surface of a lower polarizer 446.

Figure 5A:
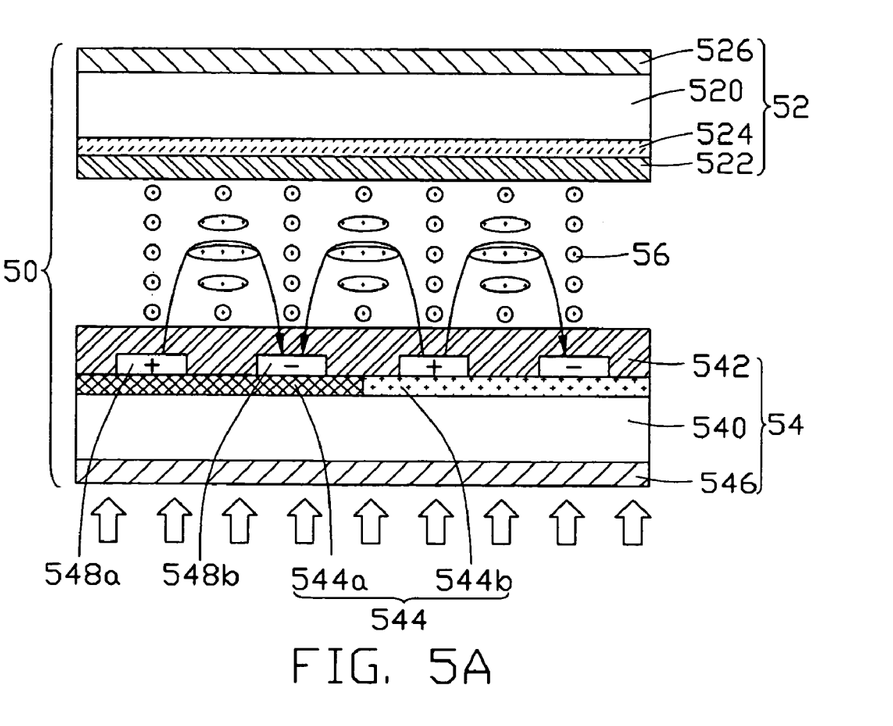
FIG. 5A is a schematic, cross-sectional view of one pixel region of an in-plane field type transflective liquid crystal display device ("the LCD") according to a fifth exemplary embodiment of the present invention, showing the LCD with a voltage applied and resulting electric fields, and backlight entering the LCD.

Referring to FIG. 5A, a liquid crystal display device 50 of Example 5 according to the present invention includes an upper substrate 52, a lower substrate 54, and a liquid crystal layer 56 interposed between the upper substrate 52 and the lower substrate 54. The upper substrate 52 comprises a color filter layer 524 and an upper polarizer 526 positioned respectively on opposite bottom and top surfaces of an upper glass plate 520. An upper alignment layer 522 is positioned on a bottom surface of the color filter layer 524, adjacent to the liquid crystal layer 56. The lower substrate 54 comprises a dielectric transflector 544 and a lower polarizer 546 positioned respectively on opposite top and bottom surfaces of a lower glass plate 540. A pair of electrodes is defined herein as a pixel electrode 548a and a common electrode 548b. A plurality of pairs of electrodes are positioned on the dielectric transflector 544 adjacent to the liquid crystal layer 56. A lower alignment layer 542 is positioned on the dielectric transflector 544, adjacent to the liquid crystal layer 56. The lower alignment layer 542 covers the pixel electrodes 548a and common electrodes 548b.

Figure 5B:
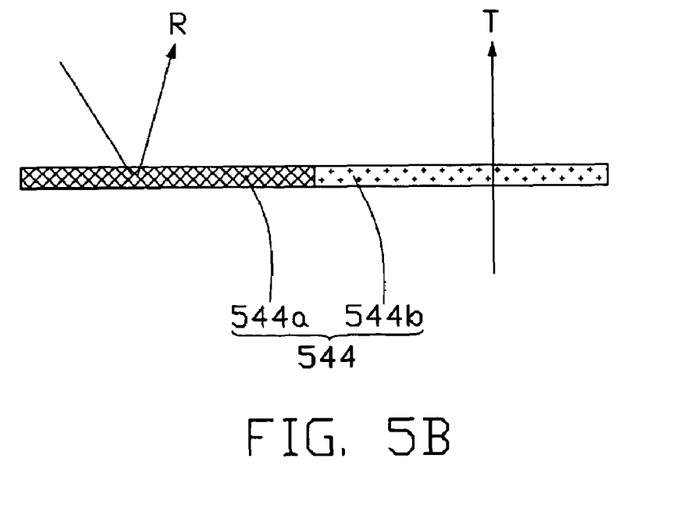
FIG. 5B is an enlarged view of a dielectric transflector of the LCD of FIG. 5A, showing essential optical paths thereof.

Referring also to FIG. 5B, the dielectric transflector 544 includes a plurality of reflective areas 544a and a plurality of transmission areas 544b arranged alternately in a regular, repeating array. The reflective areas 544a and transmission areas 544b can comprise multi-layer stacks of dielectric materials, with each stack comprising a number of thin film dielectric layers. The reflection and transmission of the dielectric transflector 544 can be controlled by adjusting the number of layers, the refractive indexes of the layers and/or the thicknesses of the layers in the stacks. Alternatively, the reflective areas 544a can be made of a highly reflective material such as aluminum, and the transmission areas 544b can be made of a translucent material or a material having one or more holes therein. A single reflective area 544a and an adjacent single transmission area 544b cooperatively define a single pixel region or part of a single pixel region. In the illustrated embodiment, for simplicity, it is assumed that a single reflective area 544a and an adjacent single transmission area 544b cooperatively define a single pixel region. Each pixel region thus comprises a transmission region and a reflection region. Accordingly, a plurality of pixel regions are defined by respective pairs of reflective areas 544a and the transmission areas 544b. In manufacturing, a ratio of areas of the reflective area 544a and the transmission area 544b is configured so that the dielectric transflector 544 can transmit backlight and can reflect ambient light. Thus the liquid crystal display device 10 of Example 5 provides a transflective display that works in both a transmission mode and a reflection mode. Further, because the dielectric transflector 544 does not conduct electricity, using the dielectric transflector 544 does not influence the distribution of electric fields in the liquid crystal layer 56.

In operation, when no voltage is applied between the pixel and common electrodes 548a and 548b, long axes of liquid crystal molecules in the liquid crystal layer 56 maintain a predetermined angle relative to the upper alignment layer 522 and the lower alignment layer 542, and the liquid crystal molecules are stationed parallel to the upper and lower substrates 52 and 54.

When a voltage is applied (in the driven state), an electric field (not labeled) is generated between the pixel and common electrodes 548a, 548b. Because the pixel electrodes 548a and the common electrodes 548b are on the same layer, the electric field is substantially parallel to the upper and lower substrates 52, 54. The substantially parallel electric field drives liquid crystal molecules of the liquid crystal layer 56 to rotate so they have a new orientation that is still parallel to the upper and lower substrates 52 and 54. The change in orientation results in a change in light transmission, and the displayed image has the important advantage of a wide viewing angle.

Figure 6:
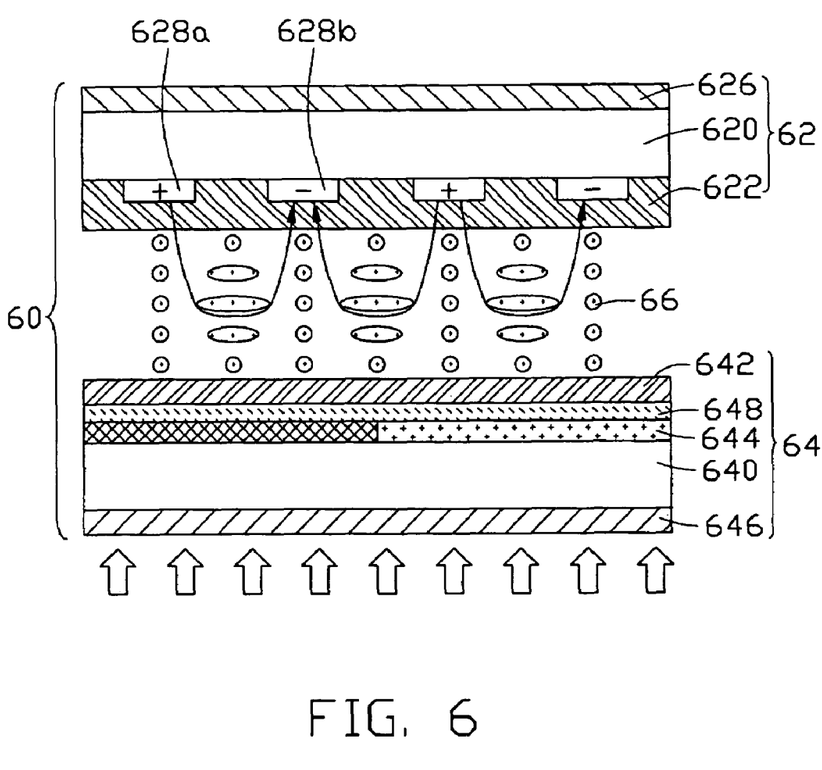
FIG. 6 is a schematic, cross-sectional view of one pixel region of an in-plane field type transflective liquid crystal display device ("the LCD") according to a sixth exemplary embodiment of the present invention, showing the LCD with a voltage applied and resulting electric fields, and backlight entering the LCD.

Referring to FIG. 6, a liquid crystal display device 60 of Example 6 according to the present invention includes an upper substrate 62, a lower substrate 64, and a liquid crystal layer 66 interposed between the upper substrate 62 and the lower substrate 64. The upper substrate 62 comprises an upper alignment layer 622 and an upper polarizer 626 positioned respectively on opposite bottom and top surfaces of an upper glass plate 620. A pair of electrodes is defined herein as a pixel electrode 628a and a common electrode 628b. A plurality of pairs of electrodes are positioned on a bottom surface of the upper glass substrate 620, with the upper alignment layer 622 covering the pairs of electrodes. The lower substrate 64 comprises a dielectric transflector 644 and a lower polarizer 646 positioned respectively on opposite top and bottom surfaces of a lower glass plate 640.

A color filter layer 648 and a lower alignment layer 642 are stacked in that order from bottom to top on a top surface of the dielectric transflector 644, with the lower alignment layer 642 being adjacent to the liquid crystal layer 66. The dielectric transflector 644 has substantially the same structure as that of the dielectric transflector 544 of Example 5.

In Examples 5 and 6, in each pixel region, a length of an optical path of light in the reflective area is substantially twice that in the transmission area. This can result in poor chromatic qualities, poor brightness, low contrast ratio, etc. in the displayed image. For balanced optical paths of light in the transmission region and the reflection region and a resultant improved displayed image, in Examples 7 through 14, a thickness of the liquid crystal layer dt in each transmission region is structured to be twice a thickness of the liquid crystal layer dr in each reflection region. That is, the liquid crystal layer is structured so that dt=2dr. With such structuring, the lengths of optical paths of light beams contributing to the displayed image (i.e., reflected light beams in the reflection region, and transmitted light beams in the transmission region) are substantially equal to each other. Although dt=2dr is preferable, dt and dr may be appropriately varied according to particular display characteristics, as long as dt>dr. Typically, dt is about 4 to 6 millimeters, and dr is about 2 to 3 millimeters. Accordingly, a kind of transmissive spacer having a thickness of about 2 to 3 millimeters is provided in each pixel region at either the upper substrate or the lower substrate.

Figure 7:
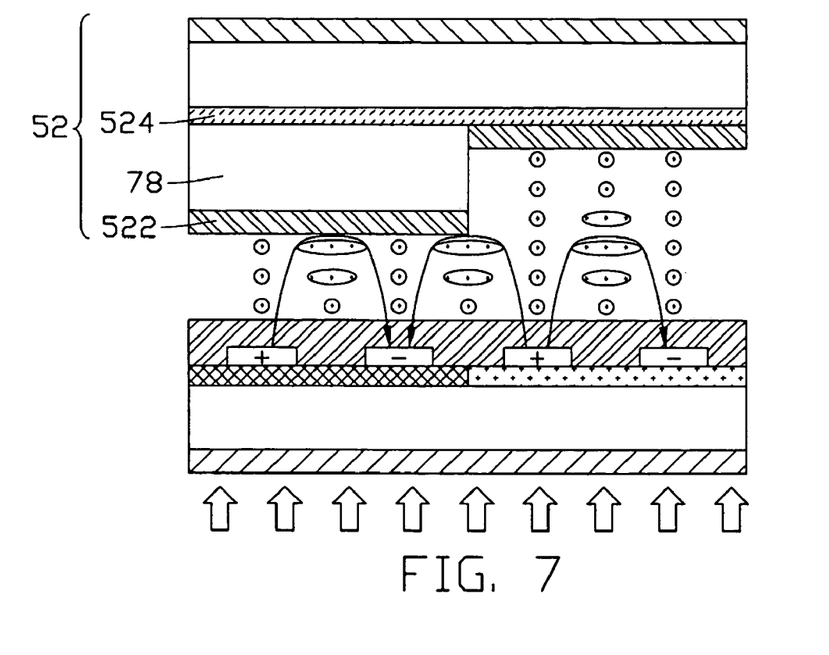
FIG. 7 is a schematic, cross-sectional view of one pixel region of an in-plane field type transflective liquid crystal display device ("the LCD") according to a seventh exemplary embodiment of the present invention, showing the LCD with a voltage applied and resulting electric fields, and backlight entering the LCD.
Figure 8:
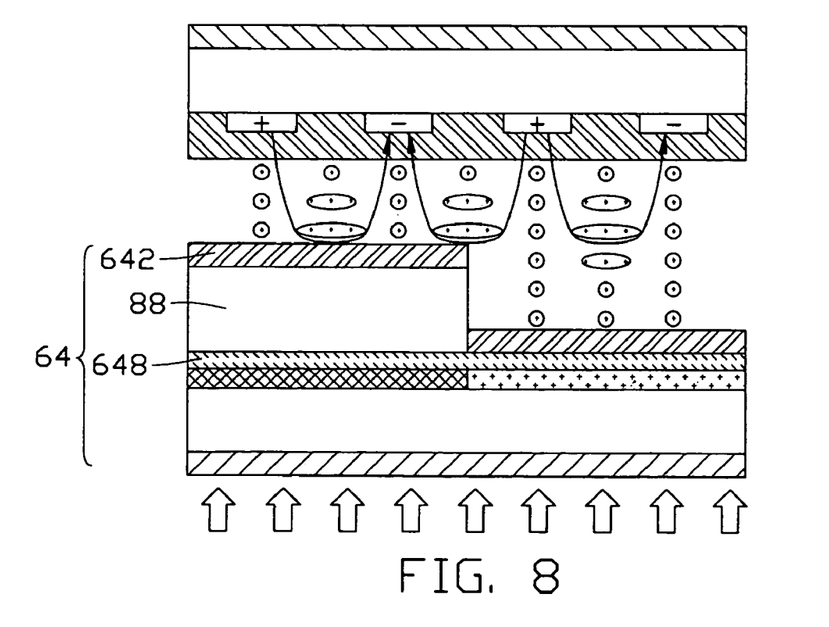
FIG. 8 is a schematic, cross-sectional view of one pixel region of an in-plane field type transflective liquid crystal display device ("the LCD") according to an eighth exemplary embodiment of the present invention, showing the LCD with a voltage applied and resulting electric fields, and backlight entering the LCD.

Referring to FIG. 7, in Example 7, a passivation layer 78 is added to the upper substrate 52 of the liquid crystal display device of Example 5. The passivation layer 78 is located between the color filter layer 524 and the upper alignment layer 522, in the reflection region. Referring to FIG. 8, in Example 8, a passivation layer 88 is added to the lower substrate 64 of the liquid crystal display device of Example 6. The passivation layer 88 is located between the color filter layer 648 and the lower alignment layer 642, in the reflection region.

Figure 9:
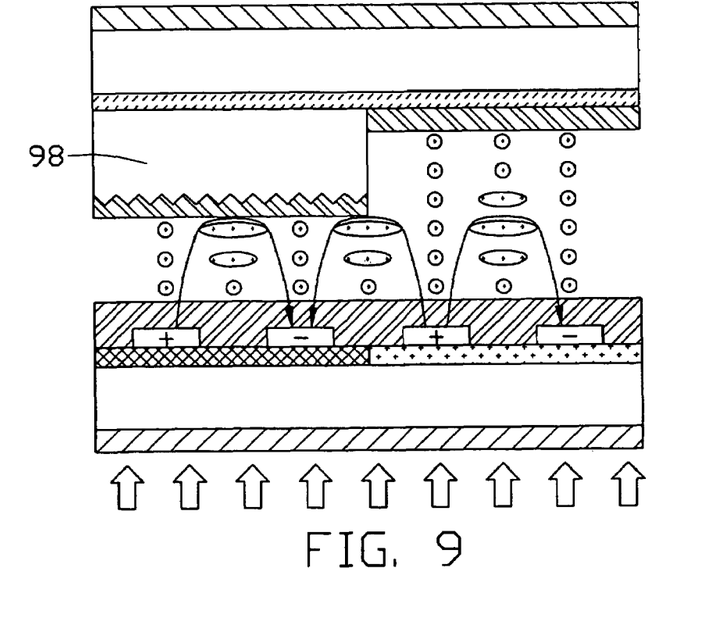
FIG. 9 is a schematic, cross-sectional view of one pixel region of an in-plane field type transflective liquid crystal display device ("the LCD") according to a ninth exemplary embodiment of the present invention, showing the LCD with a voltage applied and resulting electric fields, and backlight entering the LCD.
Figure 10:
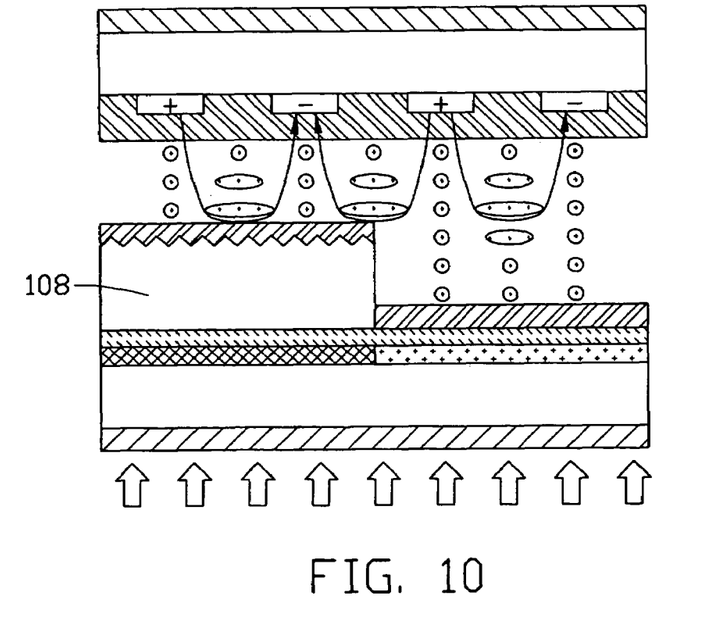
FIG. 10 is a schematic, cross-sectional view of one pixel region of an in-plane field type transflective liquid crystal display device ("the LCD") according to a tenth exemplary embodiment of the present invention, showing the LCD with a voltage applied and resulting electric fields, and backlight entering the LCD.

Referring to FIGS. 9 and 10, Examples 9 and 10 respectively shown therein are variations of Examples 7 and 8 respectively. In Examples 9 and 10, surfaces of passivation layers 98 and 108 are made uneven by etching or a like process. Typically, the surfaces define concave and convex shapes. An average thickness of the passivation layers 98 and 108 is dr. The uneven surfaces of the passivation layers 98 and 108 are advantageous over the flat surfaces of the passivation layers 78 and 88 of Examples 7 and 8. This is because the uneven surfaces receive direct and reflected ambient light at various incident angles, and thus diffuse the direct and reflected ambient light. This gives the displayed image of the liquid crystal display device more uniform and higher brightness.

In Examples 5 through 10, in each pixel region, a length of an optical light path in the color filter in the reflection region is twice a length of an optical light path in the color filter in the transmission region. This can result in uneven and poor color purity in the displayed image. For balanced color purity in the transmission region and the reflection region and a resultant improved displayed image, Examples 11 through 14 provide variations of Examples 5 and 6.

Figure 11:
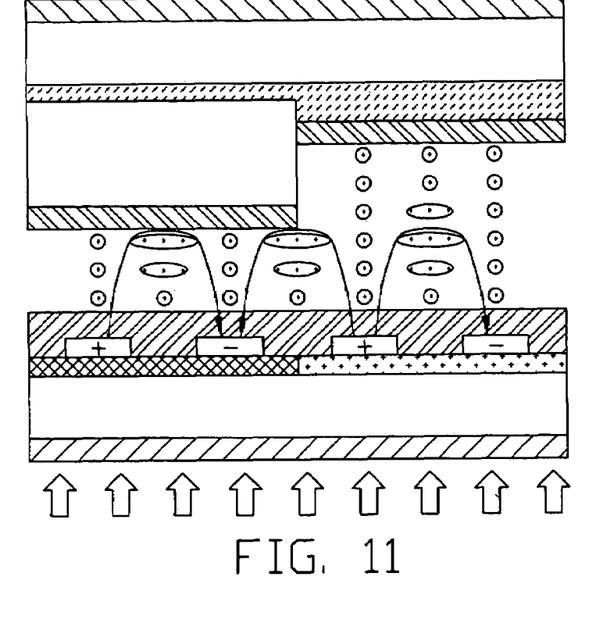
FIG. 11 is a schematic, cross-sectional view of one pixel region of an in-plane field type transfiective liquid crystal display device ("the LCD") according to an eleventh exemplary embodiment of the present invention, showing the LCD with a voltage applied and resulting electric fields, and backlight entering the LCD.
Figure 12:
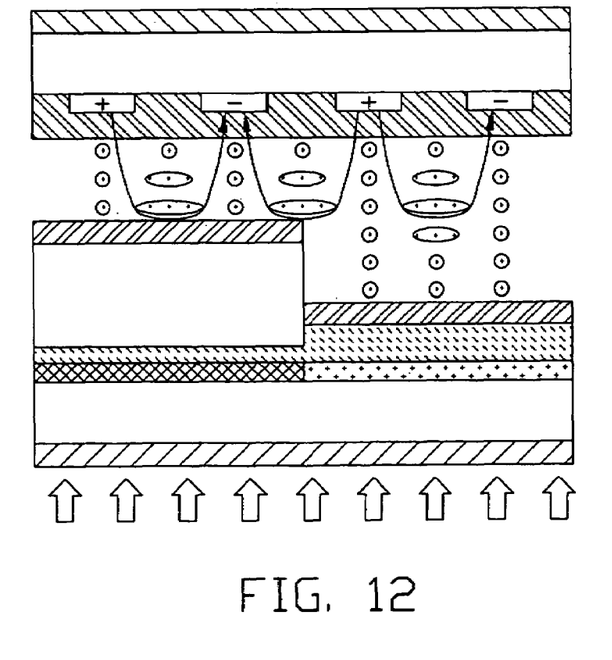
FIG. 12 is a schematic, cross-sectional view of one pixel region of an in-plane field type transflective liquid crystal display device ("the LCD") according to a twelfth exemplary embodiment of the present invention, showing the LCD with a voltage applied and resulting electric fields, and backlight entering the LCD.
Figure 13:
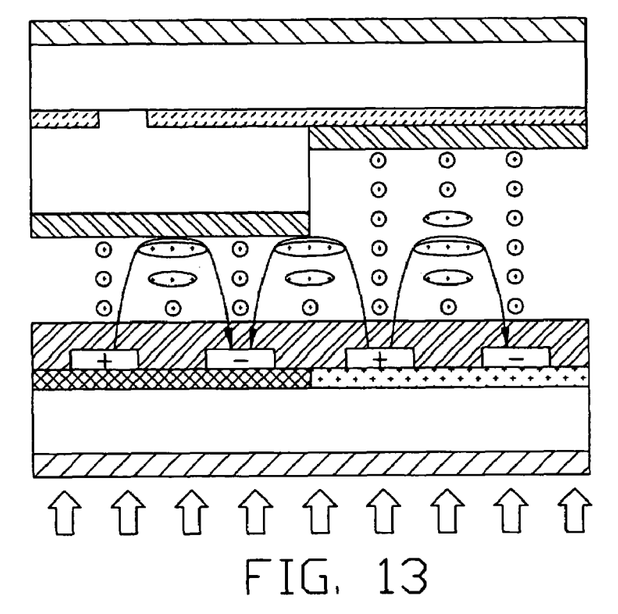
FIG. 13 is a schematic, cross-sectional view of one pixel region of an in-plane field type transflective liquid crystal display device ("the LCD") according to a thirteenth exemplary embodiment of the present invention, showing the LCD with a voltage applied and resulting electric fields, and backlight entering the LCD.
Figure 14:
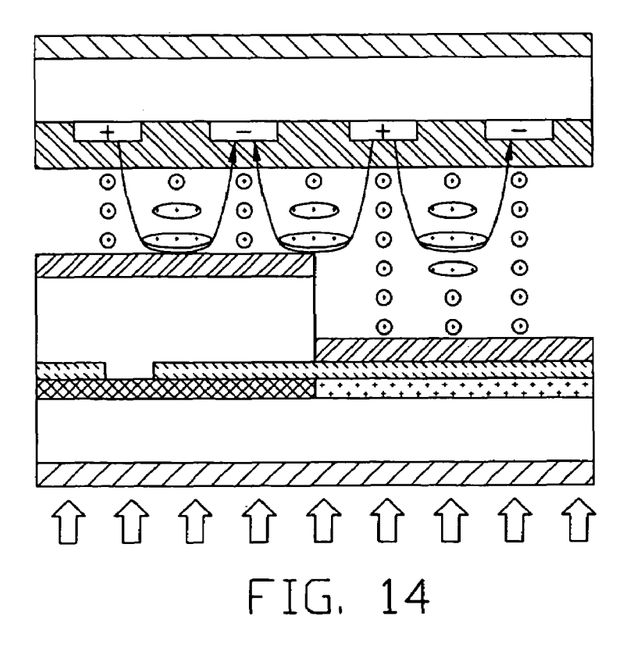
FIG. 14 is a schematic, cross-sectional view of one pixel region of an in-plane field type transflective liquid crystal display device ("the LCD") according to a fourteenth exemplary embodiment of the present invention, showing the LCD with a voltage applied and resulting electric fields, and backlight entering the LCD.

Referring to FIGS. 11 and 12, in each of Examples 11 and 12 respectively shown therein, a thickness of the color filter ft in the transmission region is structured to be twice a thickness of the color filter fr in the reflection region. That is, the liquid crystal layer is structured so that ft=2fr. With such structuring, the lengths of optical paths of light beams contributing to the displayed image (i.e., reflected colored light beams in the reflection region, and transmitted colored light beams in the transmission region) are substantially equal to each other. Referring to FIGS. 13 and 14, in each of Examples 13 and 14 respectively shown therein, the color filter in the reflection region is structured to have at least one part with no color dye therein. For example, the reflection region has at least one hole therein. With such structuring, reflected colored light beams in the reflection region and transmitted colored light beams in the transmission region have substantially equal color purity.

All the liquid crystal display devices of Examples 1 through 14 having the above-described structures effectively utilize light. In particular, the light emitted from a backlight and passing through the transmission regions when ambient light is low, and the ambient light reflected at the reflection regions when the ambient light is high. In other words, both the transmission regions and the reflection regions can be utilized to generate a display image. Moreover, each liquid crystal display device provides an even, bright display and a wide viewing angle.

It is to be understood, however, that even though numerous characteristics and advantages of the present invention have been set out in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A liquid crystal display device comprising:
an upper substrate;
a lower substrate comprising a dielectric transflector;
a liquid crystal layer interposed between the upper substrate and the lower substrate;
a plurality of pixel regions, each pixel region comprising a pixel electrode and a common electrode, for applying a voltage to the liquid crystal layer;
wherein each pixel region includes a reflection region and a transmission region; and
all the pixel and common electrodes are positioned at the upper substrate.

2. The liquid crystal display device as claimed in claim 1, wherein the dielectric transflector, comprises one or more stacks of dielectric materials, each stack comprising a plurality of thin film dielectric layers.

3. The liquid crystal display device as claimed in claim 1, wherein the dielectric transflector, the dielectric transflector in each pixel region have a reflection area corresponding to the reflection region and a transmission area corresponding to the transmission region.

4. The liquid crystal display device as claimed in claim 3, wherein the upper substrate further comprises passivation layers positioned in the reflection regions between the color filter and the alignment film.

5. The liquid crystal display device as claimed in claim 4, wherein each of the passivation layers has an uneven surface nearest to the liquid crystal layer.

6. The liquid crystal display device as claimed in claim 5, wherein a thickness of the color filter in the reflection region of each pixel region is less than a thickness of the color filter in the transmission region of the pixel region.

7. The liquid crystal display device as claimed in claim 5, wherein a part of the color filter in the reflection region of each pixel region has at least one hole therein.

8. The liquid crystal display device as claimed in claim 3, wherein the reflection area of the dielectric transflector is made of one or more highly reflective materials, and the transmission area of the dielectric transflector is made of one or more translucent materials or a material having one or more holes therein.

9. The liquid crystal display device as claimed in claim 1, wherein the tower substrate comprises in turn the dielectric transflector, a polarizer, a glass plate, and an alignment film.

10. The liquid crystal display device as claimed in claim 1, wherein the upper substrate comprises in turn a polarizer, a glass plate, the common and pixel electrodes, and an alignment film, and the lower substrate comprises in turn a polarizer, a glass plate, the dielectric transflector, a color filter, and an alignment film.

11. A liquid crystal display device comprising:
an upper substrate;
a lower substrate comprising a dielectric transflector;
a liquid crystal layer interposed between the upper substrate and the lower substrate;
a plurality of pixel regions, each pixel region comprising a pixel electrode and a common electrode, for applying a voltage to the liquid crystal layer, wherein each pixel region includes a reflection region and a transmission region; and
a color filter positioned at either the upper substrate or the lower substrate, and having different thicknesses in the reflection region and the transmission region of each pixel region;
wherein all the pixel and common electrodes are positioned at the upper substrate.

12. The liquid crystal display device as claimed in claim 11, wherein the dielectric transflector, comprises one or more stacks of dielectric materials, each stack comprising a plurality of thin film dielectric layers.

13. The liquid crystal display device as claimed in claim 11, wherein the dielectric transflector, the dielectric transflector in each pixel region have a reflection area corresponding to the reflection region and a transmission area corresponding to the transmission region.

14. The liquid crystal display device as claimed in claim 13, wherein a thickness of the color filter in the transmission region of each pixel region is substantially twice a thickness of the color filter in the reflection region of the pixel region.

15. A liquid crystal display device comprising:
an upper substrate;
a lower substrate comprising a dielectric transflector;
a liquid crystal layer interposed between the upper substrate and the lower substrate;
a plurality of pixel regions, each pixel region comprising a pixel electrode and a common electrode, for applying a voltage to the liquid crystal layer, wherein each pixel region includes a reflection region and a transmission region; and
a color filter positioned at either the upper substrate or the lower substrate, the color filter in each pixel region having a part in the reflection region with no color dye therein;
wherein all the pixel and common electrodes are positioned at the upper substrate.

16. The liquid crystal display device as claimed in claim 15, wherein the dielectric transflector, comprises one or more stacks of dielectric materials, each stack comprising a plurality of thin film dielectric layers.

17. The liquid crystal display device as claimed in claim 15, wherein the dielectric transflector, the dielectric transflector in each pixel region have a reflection area corresponding to the reflection region and a transmission area corresponding to the transmission region.

18. The liquid crystal display device as claimed in claim 15, wherein a thickness of the color filter in the transmission region of each pixel region is substantially twice a thickness of the color filter in the reflection region of the pixel region.

19. The liquid crystal display device as claimed in claim 18, wherein a part of the color filter in the reflection region of each pixel region has at least one hole therein.

* * * * *